(12) United States Patent
Wojciechowski

(10) Patent No.: US 9,482,508 B2
(45) Date of Patent: Nov. 1, 2016

(54) MEASURING WHEEL WITH FOLDING HANDLE

(71) Applicant: Johnson Level & Tool Mfg. Co., Inc., Mequon, WI (US)

(72) Inventor: Timothy J. Wojciechowski, Hubertus, WI (US)

(73) Assignee: Johnson Level & Tool Mfg. Co., Inc., Mequon, WI (US)

( * ) Notice: Subject to any disclaimer, the term of this patent is extended or adjusted under 35 U.S.C. 154(b) by 75 days.

(21) Appl. No.: 14/227,093

(22) Filed: Mar. 27, 2014

(65) Prior Publication Data

US 2015/0276365 A1    Oct. 1, 2015

(51) Int. Cl.
 *G01B 3/12*    (2006.01)

(52) U.S. Cl.
 CPC ........................ *G01B 3/12* (2013.01)

(58) Field of Classification Search
 CPC .......... G01B 3/12; G01B 5/043; E21B 47/04
 USPC .................................... 33/701, 772
 See application file for complete search history.

(56) References Cited

U.S. PATENT DOCUMENTS

| | | | |
|---|---|---|---|
| 6,892,470 B2 | 5/2005 | Olson et al. | |
| 7,040,036 B1 * | 5/2006 | Wang | G01B 3/12 33/772 |
| 7,111,412 B2 | 9/2006 | Huang | |
| 7,131,216 B2 | 11/2006 | Nepil | |
| 7,536,805 B1 * | 5/2009 | Tang | G01B 3/12 33/772 |
| 7,555,846 B1 * | 7/2009 | Wang | G01B 3/12 33/772 |
| 8,082,676 B2 | 12/2011 | Tang | |
| 8,522,448 B2 | 9/2013 | Lai | |
| 8,572,861 B2 | 11/2013 | Lai | |
| 2006/0042112 A1 * | 3/2006 | Nepil | G01B 3/12 33/772 |
| 2006/0156573 A1 * | 7/2006 | Huang | G01B 3/12 33/772 |
| 2007/0084076 A1 * | 4/2007 | Wang | G01B 3/12 33/772 |
| 2008/0148591 A1 * | 6/2008 | Kao Lin | G01B 3/12 33/772 |
| 2010/0024235 A1 * | 2/2010 | Tang | G01B 3/12 33/782 |
| 2010/0024236 A1 * | 2/2010 | Tang | G01B 3/12 33/782 |
| 2011/0180626 A1 | 7/2011 | Kang | |
| 2012/0102772 A1 * | 5/2012 | Nepil | G01B 3/12 33/701 |
| 2012/0256386 A1 * | 10/2012 | Benarrouch | B62K 15/008 280/87.05 |
| 2013/0133212 A1 * | 5/2013 | Lai | G01B 3/12 33/203 |
| 2013/0133217 A1 * | 5/2013 | Lai | G01B 3/12 33/782 |
| 2015/0276365 A1 * | 10/2015 | Wojciechowski | G01B 3/12 33/701 |

* cited by examiner

*Primary Examiner* — Yaritza Guadalupe-McCall
(74) *Attorney, Agent, or Firm* — Boyle Fredrickson, S.C.

(57) ABSTRACT

A measuring wheel includes a handle that can be folded into a non-use position. The wheel lies in a plane, and the handle moves in a plane coincident with the plane of the wheel between a collapsed position and an extended use position. The handle has a proximal section and a distal section that connect about a pivot point for movement between a collapsed position and the extended use position. The measuring wheel has a releasable engagement member associated with one of the handle sections that releasably holds the handle in the extended position. The releasable engagement member can be disengaged to allow the handle to be collapsed.

12 Claims, 4 Drawing Sheets

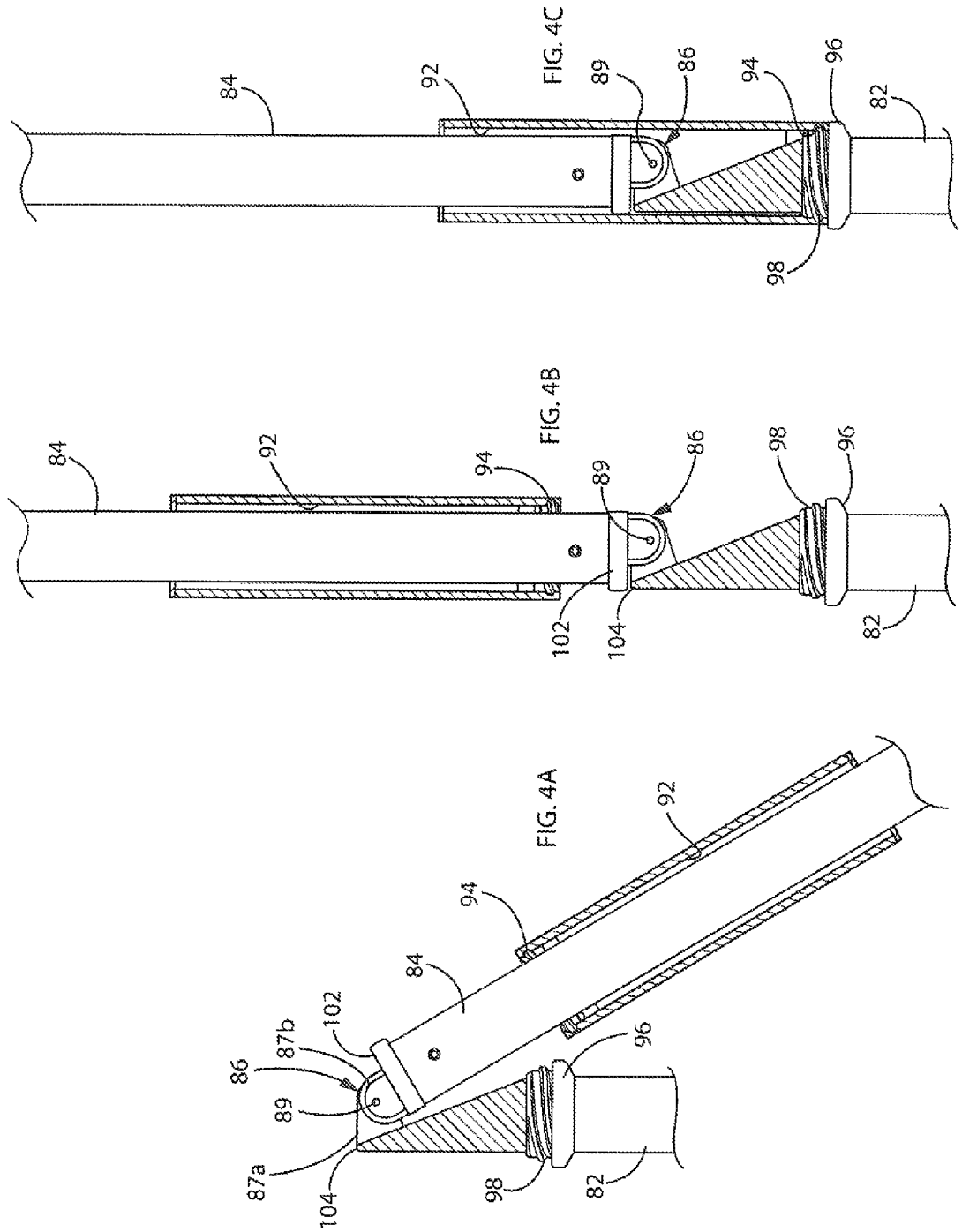

MEASURING WHEEL WITH FOLDING HANDLE

BACKGROUND OF THE INVENTION

1. Field of the Invention

The present invention relates in general to the field of measuring wheels. More particularly, the present invention relates to a measuring wheel that has a handle that can be folded or collapsed such that the handle remains in line with the wheel whether in an extended or collapsed position.

2. Discussion of the Related Art

Measuring wheels are prevalently used in a variety of applications, oftentimes in construction projects. Measuring wheels are especially convenient when used to measure long distances where it would be impractical or inconvenient to use a measuring tape.

Most common measuring wheels have the center of a wheel connected to a frame such that the wheel may rotate about a central axle. Measuring wheels also have a handle that connects to the frame, such that the measuring wheel can be pushed along a surface while the user walks behind or alongside the wheel. A measuring device is implemented to count the number of rotations, or partial rotations, of the wheel. For instance, many measuring wheels have a counter mounted to the frame with a tab that extends towards the wheel. The wheel may have a series of protrusions on one or both of its side faces that will displace the tab. The counter keeps track of the total number of times it has been displaced. The distance along the circumference of the wheel between the tabs will be a known distance such that, as the wheel is rolled along a surface, the total distance may be measured from the counter based on the number of rotations of the wheel. Other types or wheel rotation detection and counting arrangements are well known.

Many measuring wheels are bulky, which can be inconvenient during transportation, especially when transporting a number of bulky items associated with construction. Additionally, due to the extended handle that many measuring wheels feature, they can easily fall over when not in use.

What is needed, therefore, is a measuring wheel with a handle that can be collapsed when not in use, such that the measuring wheel can easily be transported and also to prevent the measuring wheel from falling over.

SUMMARY OF THE INVENTION

By way of summary, the present invention is a measuring wheel having a handle that can be collapsed into a compact configuration.

In accordance with a first aspect of the invention, the measuring wheel has a wheel, which lies in a plane, that is mounted to a frame through the center of the wheel such that the wheel is rotatably connected to the frame. The measuring wheel also has a handle with at least two sections connected to the frame. The first section is a proximal section that is connected to the frame. The second section is a distal section that is connected to the first proximal section. There is a pivot connection between the first proximal section and the second distal section. The handle has an extended position for use and a collapsed position for non-use, such as for transport and storage. To move the handle between the extended position and the collapsed position, the second distal section is rotated about the pivot connection. The measuring wheel also has a releasable engagement member that can be associated with either the first proximal section or the second distal section of the handle. The releasable engagement member can be moved to an engaged position in which the engagement member maintains the handle in the extended use position. The releasable engagement member can also be moved to a disengaged position which allows the handle to be collapsed into the non-use position. Regardless of whether the handle is in the extended use position or the collapsed non-use position, both the first proximal section and the second distal section of the handle remain in the same plane as the wheel.

In accordance with another aspect of the invention, the releasable engagement member may be in the form of a locking collar and a shoulder. The collar may slide along a portion of the handle, while the shoulder is formed as part of one of the handle sections. To secure the handle of the measuring wheel in the extended position, the collar may be placed over the pivot connection such that the distal end of the handle is not free to rotate about the pivot connection. The collar may have a twist lock connection with the shoulder. The collar may have a threaded opening, with the shoulder having a threaded portion facing in an opposite direction as the threaded opening of the collar, such that the threaded opening of the collar and the shoulder can be engaged. In one embodiment, the collar is of a cylindrical shape, and is concentric with the handle.

In accordance with another aspect of the invention, a method of converting a measuring wheel from a first configuration to a second configuration, such as from a non-use configuration to a use configuration and vice versa, involves providing a measuring wheel having a wheel portion that lies in a plane and a handle assembly that includes a first proximal section and a second distal section that are movable connected via a pivot connection. The method involves moving the distal section of the handle between first and second positions in a plane that is coincident with the plane of the wheel. The method further involves use of a releasable engagement member to selectively maintain the distal portion of the handle in an extended position for use and to allow pivoting movement, of the distal section of the handle for storage or transport.

These and other features and aspects of the present invention will be better appreciated and understood when considered in conjunction with the following description and the accompanying drawings It should be understood, however, that the following description, while indicating a representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiment illustrated in the drawings accompanying and forming a part of this specification, wherein like reference numerals designate the same elements in the several views, and in which:

FIG. 4A is an enlarged side elevation view of the pivot connection between a first and a second handle section of the measuring wheel of FIG. 1 showing the folding handle in the collapsed position;

FIG. 4B is an enlarged side elevation view of the pivot connection between the first and second handle sections of the measuring wheel of FIG. 1 showing the folding handle in the extended position before the releasable engagement member is engaged; and FIG. 4C is an enlarged side elevation view of the pivot connection between the first and second handle sections of the measuring wheel of FIG. 1 showing the folding handle in the extended position after the releasable engagement member is engaged.

Figure 1:
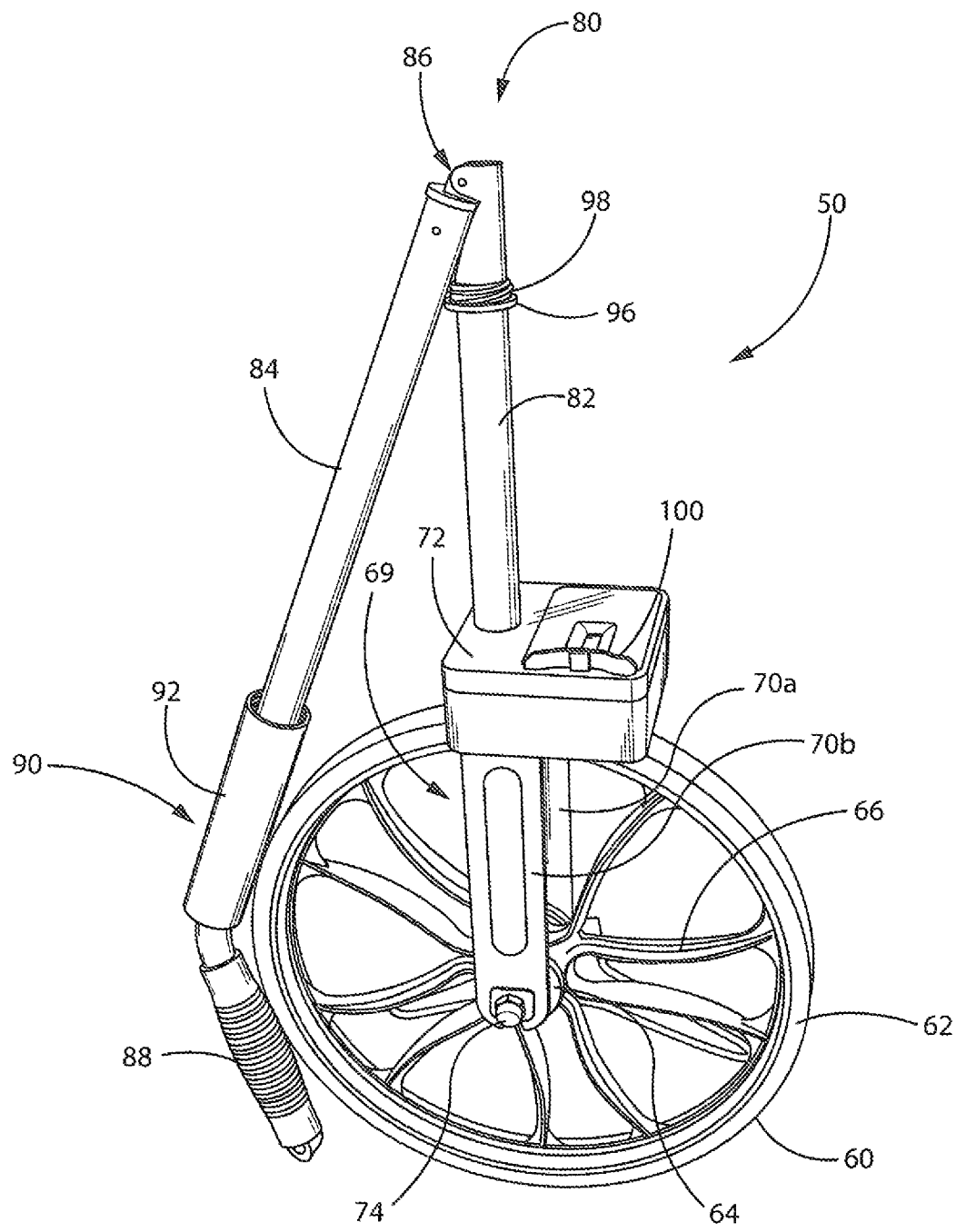
FIG. 1 is an isometric view of a measuring wheel with a folding handle in accordance with the present invention, showing the folding handle in a collapsed, non-use position.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words connected, attached, or terms similar thereto are often used. They are not limited to direct connection but include connection through other elements where such connection is recognized as being equivalent by those skilled in the art.

DETAILED DESCRIPTION

Specific embodiments of the present invention will be described by the following non-limiting examples which will serve to illustrate various features of the invention.

Figure 3:
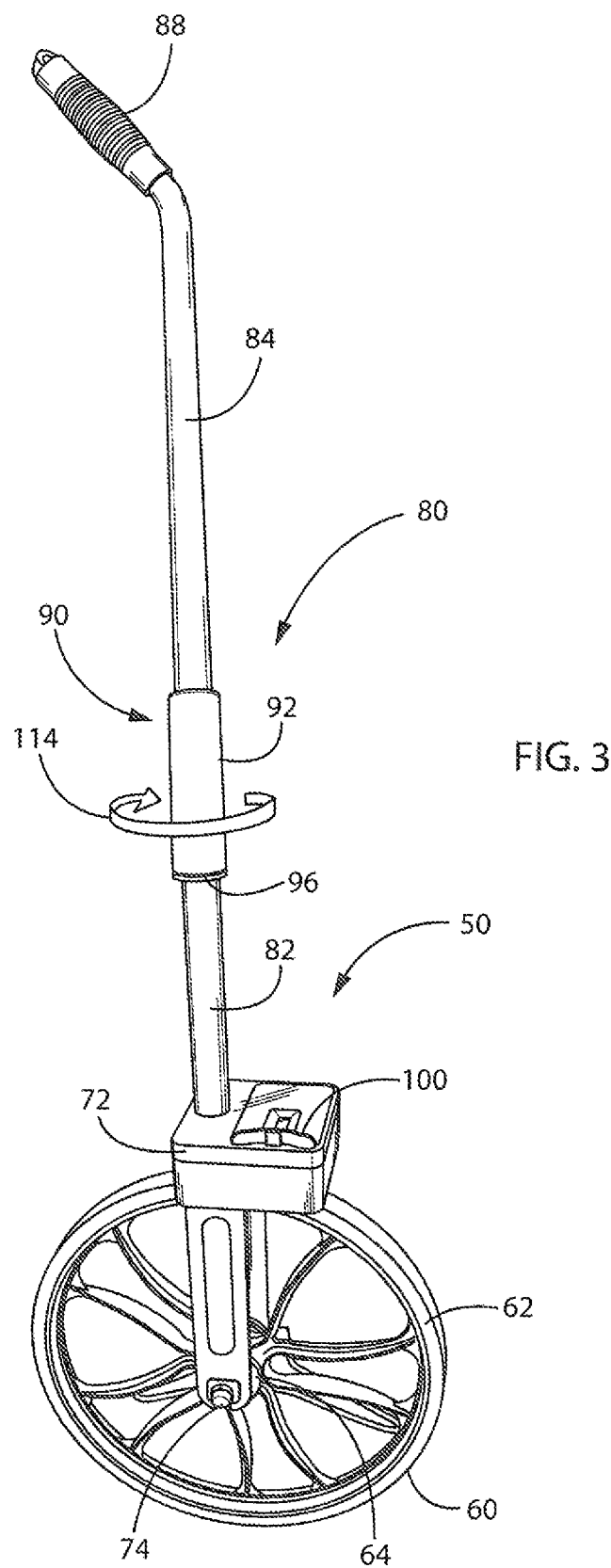
FIG. 3 is an isometric view of the measuring wheel of FIG. 1 showing the folding handle in an extended, use position.

With reference to the drawing figures in which like reference numerals designate like parts throughout the disclosure, a representative embodiment of the present invention is in the form of a measuring wheel 50 having a collapsible handle 80. In a manner to be explained, the handle 80 can be moved between a non-use position as shown in FIG. 1, such as for storage and transport, and a use position as shown in FIG. 3. In a manner as is known, the measuring wheel 50 has a wheel 60 of a known circumference such that the number of rotations of the wheel 60 can be monitored to calculate the distance traveled by the wheel 60. In the illustrated embodiment, the wheel 60 has a tread 62 that can easily travel over a variety of surfaces. For instance, the tread 62 may be made of a durable plastic or hard rubber material such that it may travel over a variety of surfaces such as concrete, gravel, sand, grass, dirt, asphalt, or other materials without damage to the wheel 60 or damage to the surface. The wheel 60 has a series of radial spokes 66 that extend between a central hub 64 of the wheel 60 and the tread 62.

The measuring wheel 50 has a frame assembly shown generally at 69 that connects to the hub 64 of the wheel 60. For instance, in the illustrated embodiment, the frame assembly 69 may include a pair of spaced-apart legs 70a, 70b that extend from a top member 72. Other embodiments may feature a single side member as would be known to one skilled in the art. The two legs 70a, 70b are attached to the hub 64 of the wheel 60 by an axle 74, although any other rotatable attachment arrangement may be used. Also as is known, a counter 100 may be attached to the frame assembly 69 to measure the number of rotations of the wheel 60. In the illustrated embodiment, the counter 100 is carried by the top member 72, although it is understood that the counter 100 may be mounted in any other satisfactory location on measuring wheel 50. For example, a common measuring arrangement features a series of equally spaced tabs (not shown) that extend outwardly from the wheel 60 at radial spacings that correspond to predetermined linear distance of travel as wheel 60 is rotated on a surface. The counter 100 measures the tab counts to determine the total distance the wheel 60 has traveled. Again, it is understood that any other type of counting arrangement may be employed.

Figure 2:
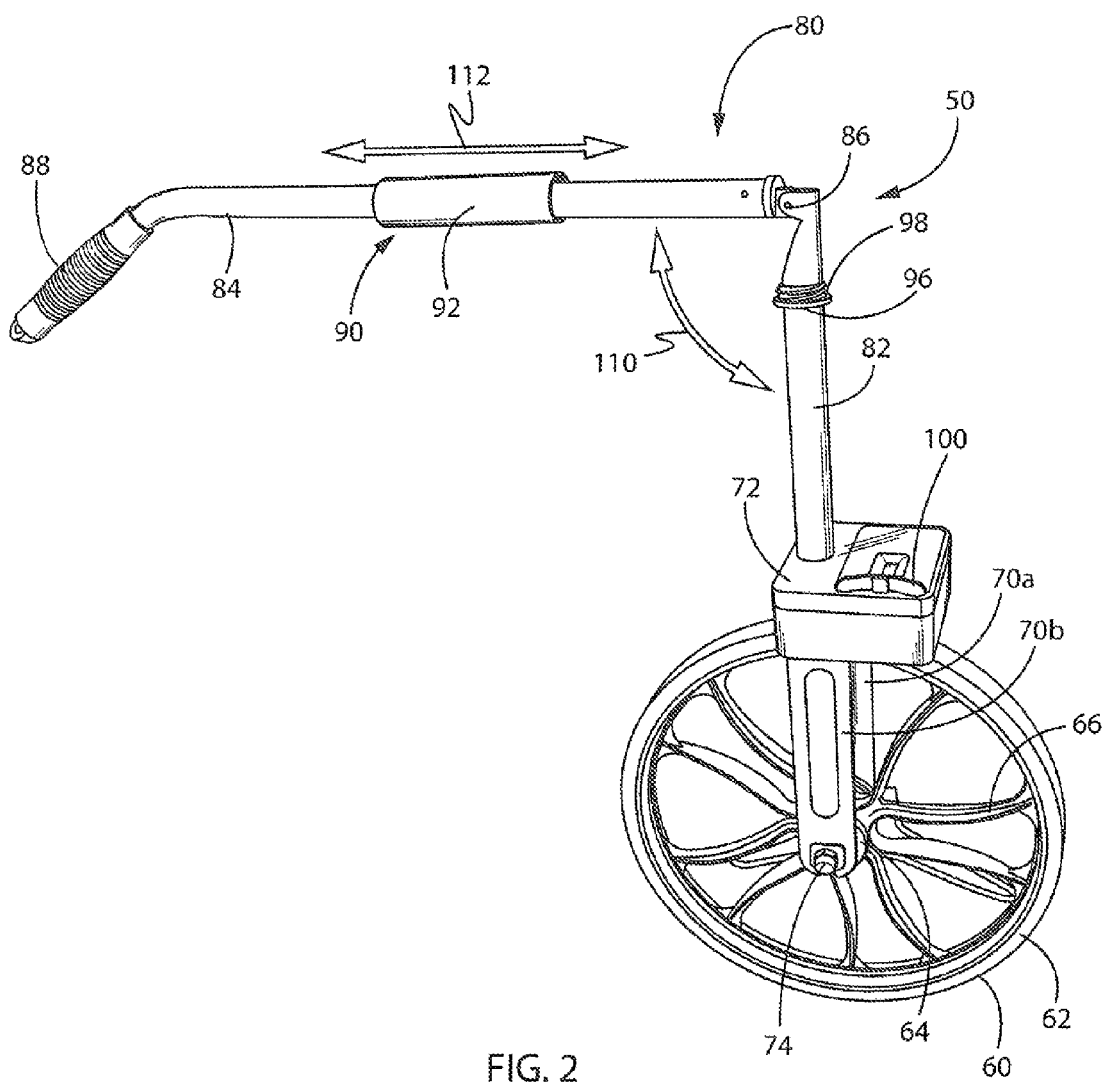
FIG. 2 is an isometric view of the measuring wheel of FIG. 1 showing movement of the folding handle between the collapsed position and an extended position.

A handle 80 is connected to the top member 72 of the frame assembly 69. In the illustrated embodiment, the handle 80 has two sections: a first proximal section 82 and a second distal section 84. The first proximal section 82 of the handle 80 is directly connected to the top member 72 of the frame so as to be in a fixed angular position relative to frame assembly 69. The first proximal section 82 extends upward from the top member 72 of the frame assembly 69. The first proximal section 82 lies in the same plane as the wheel 60. The second distal section 84 of the handle 80 is connected to the first proximal section 82 via a pivot connection 86. The pivot connection 86 includes tabs 87a, 87b at the outer end of proximal section 82 and the inner end of distal section 84, respectively, which are pivotably connected together via a pivot pin 89 that defines a pivot axis oriented perpendicular to the plane of wheel 60. In this manner, the second distal section 84 of the handle 80 rotates about the pivot axis defined by pivot pin 89 between non-use and use positions as shown in FIGS. 1-3 in sequence. Arrow 110 (FIG. 2) illustrates such movement of distal handle section 84 about the pivot connection 86.

Referring first to FIG. 1, the handle 80 is illustrated in a collapsed position, in which the second distal section 84 of the handle 80 is folded over towards the wheel 60. The measuring wheel 50 can be in the collapsed position when it is not in use, such as during transport or storage. This configuration makes the measuring wheel 50 more compact for easier transportation and storage. It also lowers the center of gravity of the measuring wheel 50, which makes it less likely for the measuring wheel 50 to fall over in the event it includes a kickstand to maintain it in an upright position. Referring to FIG. 2, the second distal section 84 of the handle 80 is illustrated as being rotated about the pivot connection 86 upwardly away from the wheel 60, for converting measuring wheel 50 from the non-use configuration of FIG. 1 to the use configuration of FIG. 3. FIG. 3 shows the measuring wheel 50 in a use configuration in which the handle 80 is in an extended position. When measuring wheel 50 is in the use configuration, the first proximal section 82 and the second distal section 84 are substantially in line. It is understood, however, that the first proximal section 82 and the second distal section 84 may be configured so as not to be in alignment when measuring wheel 50 is in the use configuration, e.g., the distal section 84 may be oriented at an angle relative to the proximal section 82. At the end of the second distal section 84 is a grip 88, which a user may grasp when operating the measuring wheel 50.

The measuring wheel 50 also has a releasable engagement arrangement which is operable to selectively maintain the handle 80 in the extended position shown in FIG. 3. In the illustrated embodiment, the releasable engagement arrangement includes a locking member in the form of a collar or cylinder 90 that is selectively engageable with a shoulder section 96. In the illustrated embodiment, locking cylinder 90 includes a threaded portion 94 at its inner end and shoulder section 96 includes a threaded end portion 98. The locking cylinder 90 may be in the form of a cylindrical tube defining a passage 92 within which the distal section 84 of the handle 80 is received, and has a threaded inner end portion 94. Locking cylinder 90 is configured to slide along the handle 80, as shown by arrow 112 in FIG. 2. When the second distal section 84 of the handle 80 is rotated to the extended position, as seen in FIG. 3, the locking cylinder 90 is used to secure the handle 80 in the extended position. This is accomplished by aligning the threaded end portion 94 of the locking cylinder 90 with the facing threaded end portion 98 of the shoulder 96 and twisting the locking cylinder 90 such that the threaded portions 94, 98 are engaged. When engaged, the locking cylinder 90 is positioned over the pivot connection 86 such that the handle 80 cannot pivot. It is understood that which locking cylinder 90 and shoulder 96 may be used to secure distal handle section 84 in the extended position, other alternatively configured releasable engagement arrangements may be used to hold the handle sections in an extended position.

FIGS. 4A-4C illustrate operation of the releasable engagement arrangement described above. FIG. 4A shows the handle 80 when the measuring wheel 50 is in a first collapsed position, as shown in FIG. 1. In this configuration, the second distal section 84 of the handle 80 is lowered in the collapsed position and the locking cylinder 90 and the shoulder 96 are not engaged. The second distal section 84 of the handle 80 can then be raised, as seen in FIG. 4B, such that first proximal section 82 and the second distal section 84 of the handle 80 are aligned. In order to accomplish such alignment, the end surface of a stop plate 102 located at the inner end of distal section 84 comes into engagement with the upper end of proximal handle section 82. In this position, the handle 80 of the measuring wheel 50 is not locked into the extended position, however, and can still easily be collapsed. In the event the user drops the grip 88 without engaging the locking cylinder 90 and the shoulder 96, the second distal section 84 of the handle 80 will fall back into the collapsed position. To maintain the handle 80 in the extended position for use, the locking cylinder 90 is slid along the length of the second distal section 84 until it abuts the shoulder 96. Then, the locking cylinder 90 may be twisted, as shown by arrow 114 in FIG. 3, to engage the threaded portion 94 of the locking cylinder 90 with the threaded portion 98 of the shoulder 96. Once the two threaded portions 94, 98 have been engaged, the handle 80 will remain in the extended position. As best shown in FIG. 4C, the locking cylinder 90 will slide over the pivot connection 86 when engaged with the shoulder 96. This prevents rotation of the second distal section 84 of the handle 80 about the pivot connection 86.

To disengage the releasable engagement member, the locking cylinder 90 can be twisted to disengage the threaded portion 94 of the locking cylinder 90 from the threaded portion 98 of the shoulder 96. The locking cylinder 90 is twisted in the opposite direction as when the threaded portions 94, 98 are engaged. The locking cylinder 90 is then moved away from pivot connection 86 such that the second distal section 84 is free to rotate about the pivot connection 86.

As can be appreciated from FIGS. 1-3, the illustrated embodiment of the measuring wheel 50 allows both the first proximal section 82 and the second distal section 84 of the handle 80 to be in the same plane as the wheel 60 when the handle 80 is in the collapsed position. Both sections of the handle 80 remains in the same plane as the wheel 60 as the second distal section 84 is rotated about the pivot connection 86 towards the extended position. When the handle 80 is in the extended position, both the first proximal section 82 and the second distal section 84 still remain in the same plane as the wheel 60. This creates a measuring wheel that can easily be moved between an extended and collapsed position in an ergonomically efficient manner, and that occupies a minimal amount of space when collapsed.

Various alternatives and embodiments are contemplated as being within the scope of the following claims particularly pointing out and distinctly claiming the subject matter regarded as the invention.

I claim:
1. A measuring wheel comprising:
a frame having an upper handle mounting portion and a lower wheel mounting portion located below the upper handle mounting portion;
a wheel rotatably connected to the lower wheel mounting portion of the frame, wherein the upper handle mounting portion of the frame is located above the wheel, and wherein the wheel is rotatable about an axis of rotation and is movable in a front-rear direction of movement upon rotation about the axis of rotation;
a counter carried by the frame, wherein the counter is arranged to interact with the wheel and counts revolutions of the wheel as the wheel is moved in the front-rear direction of movement along a surface;
a handle connected to the upper handle mounting portion of the frame, wherein the handle has a first proximal section connected to the upper handle mounting portion of the frame at a location above the wheel, and wherein the handle further has a second distal section connected to the first proximal section via a pivot connection having a pivot axis oriented parallel to the axis of rotation of the wheel for providing movement of the handle between an extended use position and a collapsed non-use position, wherein the second distal section of the handle moves in the front-rear direction when the second distal section of the handle is moved between the extended use position and the collapsed non-use position about the pivot axis; and
a releasable engagement member associated with one of the handle sections, wherein the releasable engagement member is movable between an engaged position wherein the handle is in the extended use position in which the first proximal section of the handle and the second distal section of the handle are non-movably secured together, and a disengaged position in which the second distal section of the handle can be moved about the pivot connection relative to the first proximal section of the handle to position the handle in the collapsed non-use position.

2. The measuring wheel of claim 1, wherein the releasable engagement member comprises a tubular locking member carried by one of the handle sections that is selectively engageable with a shoulder on the other of the handle sections.

3. The measuring wheel of claim 2, wherein the tubular locking member is configured to slide along the handle section.

4. The measuring wheel of claim 2, wherein the tubular locking member is located over the pivot connection when the handle is in the extended use position.

5. The measuring wheel of claim 2, wherein the tubular locking member has a twist lock connection with the shoulder.

6. The measuring wheel of claim 5, wherein the tubular locking member has a threaded connection with the shoulder.

7. The measuring wheel of claim 2, wherein the tabular locking member has a cylindrical shape and is concentric with the handle section.

8. The measuring wheel of claim 1, wherein the wheel rotates in a plane oriented perpendicularly to the axis of rotation of the wheel, and wherein the second distal section of the handle moves in a plane coincident with the plane of rotation of the wheel when the second distal section of the handle is moved between the extended use position and the collapsed non-use position.

9. A method of moving a collapsible measuring wheel between a collapsed non-use configuration and an extended use configuration, comprising the steps of:

providing a measuring wheel that includes a frame having an upper handle mounting portion and a lower wheel mounting portion located below the upper handle mounting portion; a wheel rotatably connected to the lower wheel mounting portion of the frame, wherein the upper handle mounting portion of the frame is located above the wheel, and wherein the wheel is rotatable about an axis of rotation, wherein rotation of the wheel about the axis of rotation results in movement of the wheel in a front-rear direction of movement; a counter carried by the frame, wherein the counter is arranged to interact with the wheel and counts revolutions of the wheel as the wheel is moved in the front-rear direction of movement along a surface; a handle connected to the upper handle mounting portion of the frame, the handle having a first proximal section connected to the upper handle mounting portion of the frame at a location above the wheel and a second distal section connected to the first proximal section via a pivot connection having a pivot axis oriented parallel to the axis of rotation of the wheel, wherein the second distal section of the handle is movable about the pivot connection between a collapsed non-use position and an extended use position; and a releasable engagement member associated with one of the handle sections, wherein the releasable engagement member is movable between an engaged position and a disengaged position;

rotating the second distal section of the handle away from the collapsed non-use position about the pivot connection and upwardly relative to the wheel until the second distal section of the handle reaches the extended use position, wherein movement of the second distal section to the extended use position about the pivot axis is in the front-rear direction; and releasably securing the releasable engagement member in the engaged position in which the releasable engagement member is on one of the handle sections and is engaged with a receiver arrangement on the other of the handle sections to releasably maintain the handle in the extended use position.

10. The method of claim 9, wherein the releasable engagement member in the engaged position is secured over the pivot connection to hold the second distal section of the handle in the extended position.

11. The method of claim 9, further comprising the steps of:

moving the releasable engagement member to the disengaged position; and rotating the second distal section of the handle about the pivot connection towards the wheel in the front-rear direction to the collapsed non-use position.

12. The method of claim 9, wherein the wheel rotates in a plane oriented perpendicularly to the axis of rotation of the wheel, and wherein movement of the second distal section of the handle between the collapsed non-use position and the extended use position is in a plane coincident with the plane of rotation of the wheel.

\* \* \* \* \*